US009427821B2

(12) United States Patent
Partridge (10) Patent No.: US 9,427,821 B2
(45) Date of Patent: Aug. 30, 2016

(54) INTEGRATED MAGNETRON PLASMA TORCH, AND RELATED METHODS

(71) Applicant: Agilent Technologies, Inc., Loveland, CO (US)

(72) Inventor: Guthrie Partridge, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 252 days.

(21) Appl. No.: 14/156,990

(22) Filed: Jan. 16, 2014

(65) Prior Publication Data

US 2014/0263202 A1    Sep. 18, 2014

Related U.S. Application Data

(60) Provisional application No. 61/793,320, filed on Mar. 15, 2013.

(51) Int. Cl.
*B23K 10/02* (2006.01)
*H05H 1/30* (2006.01)

(52) U.S. Cl.
CPC .............. *B23K 10/02* (2013.01); *H05H 1/30* (2013.01)

(58) Field of Classification Search
CPC ............ H05H 1/30; H05H 1/34; H05H 1/46; B23K 10/02; H05B 1/26
USPC ............ 219/121.52, 121.36, 121.48, 121.59, 219/121.51, 75
See application file for complete search history.

(56) References Cited

U.S. PATENT DOCUMENTS

| | | | |
|---|---|---|---|
| 2,414,085 A | 12/1944 | Hartman | |
| 5,270,515 A * | 12/1993 | Long | B01J 19/126 110/243 |
| 5,308,977 A | 5/1994 | Oishi et al. | |
| 5,349,154 A | 9/1994 | Harker et al. | |
| 6,049,170 A | 4/2000 | Hochi et al. | |
| 6,064,154 A | 5/2000 | Crouch et al. | |
| 6,207,924 B1 * | 3/2001 | Trassy | B22F 1/0085 219/121.47 |
| 6,683,272 B2 | 1/2004 | Hammer | |
| 6,899,054 B1 | 5/2005 | Bardos et al. | |
| 7,030,979 B2 | 4/2006 | Hammer | |

(Continued)

FOREIGN PATENT DOCUMENTS

DE    69719145    7/2003
DE    102010043940    8/2012

(Continued)

OTHER PUBLICATIONS

Hok, Gunnar; The Microwave Magnetron, Advances in Electronics, vol. II, edited by L. Marton, New York, Academic Press, 1950, p. 219-249.

(Continued)

*Primary Examiner* — Mark Paschall (57) ABSTRACT

A plasma source for generating microwave-induced plasma includes a plasma torch integrated with a microwave energy source. The torch establishes a gas flow path from one side of the plasma source to the other side. The torch may be integrated with the microwave energy source such that a plasma-forming gas flowing through the torch is subjected to microwave radiation, which serves to initiate and/or sustain plasma in the torch. The plasma may be ejected from the torch and utilized in various applications involving the use of plasma, including analytical techniques such as optical emission spectrometry and mass spectrometry.

20 Claims, 4 Drawing Sheets

(56) References Cited

U.S. PATENT DOCUMENTS

| | | | |
|---|---|---|---|
| 7,628,962 B1 | 12/2009 | Brandenburg | |
| 7,967,891 B2 * | 6/2011 | Paserin | B22F 1/0018 |
| | | | 75/346 |
| 8,168,128 B2 | 5/2012 | Seeley et al. | |
| 2002/0050323 A1 * | 5/2002 | Moisan | B01D 53/32 |
| | | | 156/345.41 |
| 2003/0000823 A1 * | 1/2003 | Uhm | B01D 53/323 |
| | | | 204/157.43 |
| 2004/0173579 A1 | 9/2004 | Carr | |
| 2010/0062288 A1 | 3/2010 | Weber et al. | |
| 2010/0226831 A1 | 9/2010 | Lee | |
| 2010/0277724 A1 * | 11/2010 | Bounouar | G01N 21/66 |
| | | | 356/316 |
| 2013/0328483 A1 | 12/2013 | Gesche et al. | |
| 2014/0225504 A1 * | 8/2014 | Kaneko | H01J 37/32935 |
| | | | 315/111.21 |

FOREIGN PATENT DOCUMENTS

| | | |
|---|---|---|
| JP | S60189198 A | 9/1985 |
| JP | S63310795 A | 12/1988 |
| JP | H04105048 A | 4/1992 |

OTHER PUBLICATIONS

Japanese Search Report for GB1402069.7 mailed Aug. 26, 2014.
Office action dated Nov. 5, 2015 from related German Application No. 10 2014 202 540.0.

* cited by examiner

INTEGRATED MAGNETRON PLASMA TORCH, AND RELATED METHODS

RELATED APPLICATIONS

This application claims the benefit of U.S. Provisional patent application Ser. No. 61/793,320, filed Mar. 15, 2013, titled "INTEGRATED MICROWAVE SOURCE AND PLASMA TORCH, AND RELATED METHODS," the content of which is incorporated by reference herein in its entirety.

TECHNICAL FIELD

The present invention relates generally to microwave-induced plasma, and in particular to generation of microwave-induced plasma in a plasma torch and uses thereof.

BACKGROUND

Many plasma-based chemical analysis instruments utilize a radio frequency (RF, 10-100 MHz) inductively coupled plasma (ICP) and utilize argon as the process gas. While argon ICP is a relatively mature and effective technology, supplying argon for these instruments adds a significant cost of ownership, and is subject to the availability of purified argon gas. To address the needs of new and emerging markets (rural, portable, developing world, etc.) recent interest is being directed to producing instruments of similar function that can operate with a less expensive, more available gas such as molecular nitrogen ($N_2$).

Due to the differences in the properties of argon and nitrogen plasmas, microwave radiation in the range of several GHz (as opposed to RF radiation) is often better suited for energizing nitrogen plasmas. An instrument configured for generating such plasmas may include a power subsystem that delivers microwave power to a process gas flowing through a tube (or set of nested tubes). The microwave radiation ionizes the gas into plasma. The resulting microwave-induced plasma (MIP) may be utilized to heat, evaporate/dry/desolvate, atomize, electronically excite and ionize analyte materials, thereby enabling subsequent detection and analysis of emitted light or ions.

The microwave power subsystem may include a microwave power source and an electromagnetically resonant structure coupled by a power transfer element such as a free-space waveguide or a coaxial cable. This system may also require additional elements for impedance matching of its various components, including manual and/or servo-locked stub tuners and movable shorting walls. Also, microwave isolators and circulators are often included to protect the power source from reflected power in the case of an impedance mismatch situation.

Known microwave power subsystems are associated with disadvantages. Due to their multi-component configuration, they are relatively bulky and costly. Also, automated tuning algorithms may be needed to achieve and maintain acceptable performance, and the tuning process, in turn, involves moving parts. These factors detract from suitability in the sought-after "in the field" applications market. In addition, due to the high volume and/or area of the multi-component design there is significant power dissipation (energy loss), mostly by the walls of the guiding structure. In addition, there is a mismatch between the electromagnetic (EM) field patterns in commonly used resonant structures (e.g., rectangular waveguides or coaxial cables) and the field patterns that tend to produce the cylindrical or toroidal plasma symmetry that is preferred for spectroscopy/spectrometry applications. These mismatches contribute to compromised performance and stability in current designs, which remains a topic of ongoing research.

Therefore, there continues to be a need for improved systems, devices and methods for generating MIP for various applications.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a plasma source for generating microwave-induced plasma includes: a microwave energy source comprising a cathode on a cathode axis, and an anode spaced from the cathode by an interaction space, wherein the microwave energy source comprises a first side, a second side, and a thickness from the first side to the second side along the cathode axis; and a plasma torch positioned at the microwave energy source and comprising a torch outlet on the second side, wherein the plasma torch establishes a gas flow path from the first side to the second side.

According to another embodiment, a plasma processing system includes: the plasma source, wherein the plasma torch includes a torch inlet on the first side; a plasma-forming gas source communicating with the torch inlet; and a chamber communicating with the torch outlet.

According to another embodiment, a method for supplying plasma includes: generating microwave energy by operating a microwave energy source that comprises a first side and a second side generating plasma by flowing a plasma-forming gas into a plasma torch from the first side, wherein the plasma-forming gas is irradiated by the microwave energy; and flowing the plasma from an outlet of the plasma torch on the second side.

According to another embodiment, a plasma source or plasma processing system is configured for performing any of the methods disclosed herein.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
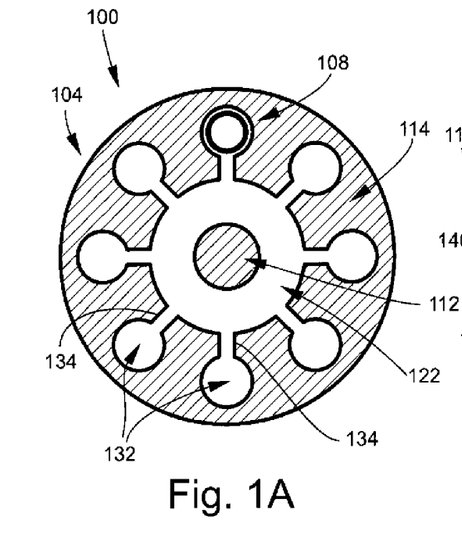
FIG. 1A is a plan view of an example of a plasma source according to some embodiments.
Figure 1B:
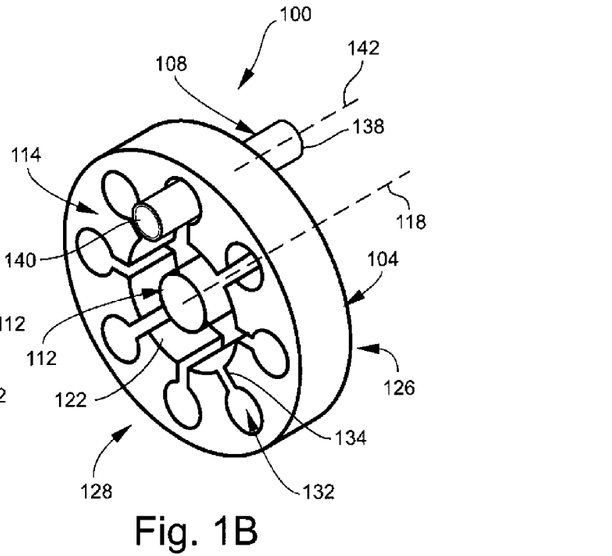
FIG. 1B is a perspective view of the plasma source illustrated in FIG. 1.

FIGS. 1A and 1B are respective plan and perspective views of an example of microwave-induced plasma (MIP) source 100 according to some embodiments. The plasma source 100 may generally include a microwave energy source (or microwave energy generator) 104 and a plasma torch 108 integrated with the microwave energy source 104.

Generally, the microwave energy source 104 may have any configuration suitable for generating microwave energy at a frequency and power that induces the formation of plasma from a plasma-forming gas flowing through the plasma torch 108. In some embodiments, as illustrated in FIGS. 1A and 1B, the microwave energy source 104 may have a magnetron or magnetron-like structure. Generally, the plasma torch 108 may have any configuration suitable for conducting a flow of gas along a defined path, and enabling the formation of a plasma plume (or plasma discharge). The plasma torch 108 may be integrated with the microwave energy source 104 in any manner that ensures that the flowing gas will be irradiated by the as-generated microwave energy. The plasma torch 108 may be configured to conduct the as-produced plasma, as well as any gas and/or other flowable components in the torch interior, to a desired destination external to the microwave energy source 104.

The microwave energy source 104 generally includes a cathode 112 and an anode 114. In the illustrated embodiment, the cathode 112 is positioned along a cathode axis (or source axis) 118. The cathode 112 may, for example, be cylindrical, and may be solid or hollow. The cathode 112 may be composed of any suitable electrically conductive material. In some embodiments the cathode 112, or a coating or layer thereof, may be composed of a thermionically emitting material to provide a source of electrons. Additionally or alternatively, a filament (e.g., a tungsten filament, not shown) may be provided. Additionally or alternatively, another type of electron source (e.g., a field emission source) may be provided. In the illustrated embodiment, the anode 114 is an annular block of electrically conductive material (e.g., copper), and coaxially surrounds the cathode 112 about the cathode axis 118. Hence, in the present embodiment the main structure (cathode 112 and anode 114) of the microwave energy source 104 is rotationally symmetrical about the cathode axis 118, which is the central axis in this case. Relative to the cathode axis 118, the anode 114 is spaced from the cathode 112 by an interaction space 122, in which magnetic and electric fields interact to impart force to electrons. The microwave energy source 104 may be considered as including a first side 126 and a second side 128 which, from the perspective of a gas flowing through the plasma torch 108, may also be referred to as an input side and an output side. The first side 126 and second side 128 may lie in planes orthogonal to the cathode axis 118. Thus, the main structure of the microwave energy source 104 may be generally planar and has a thickness from the first side 126 to the second side 128 along the cathode axis 118.

The anode 114 may include one or more resonant cavities or side lobes 132 formed through its thickness, which function as tuned circuits. In the illustrated embodiment, the anode 114 includes a plurality of resonant cavities 132 positioned at one or more radial distances from the cathode axis 118, and circumferentially spaced from each other about the cathode axis 118. The resonant cavities 132 are in open communication with the common interaction space 122 by way of openings 134, which partition the anode 114 into a plurality of anode segments circumferentially arranged about the cathode axis 118. The number of resonant cavities 132 illustrated in FIGS. 1A and 1B is by example only. The number and size of the resonant cavities 132 may vary in different embodiments. In some embodiments, the outer diameter of the anode 114 may be on the order of centimeters, but more generally no specific limitation is placed on the size of the anode 114.

In the illustrated embodiment, the resonant cavities 132 are shaped as cylinders of circular cross-section and the openings 134 are shaped as radial slots. This geometry is an example of a hole-and-slot magnetron. In other embodiments, the microwave energy source 104 may be structured as a vane magnetron, a slot magnetron, or a rising-sun magnetron, the geometries and properties of which are known to persons skilled in the art. More generally, the geometry may be symmetrical, substantially symmetrical, or asymmetrical about the cathode axis 118.

The plasma torch 108 generally includes a torch inlet 138 and a torch outlet 140. As noted above the plasma torch 108 may be integrated with, or positioned at, the microwave energy source 104 in any manner that ensures that the flowing gas will be irradiated by the as-generated microwave energy. The plasma torch 108 may be positioned or mounted at the microwave energy source 104 such that the torch inlet 138 is on the first side 126 and the torch outlet 140 is on the second side 128. The plasma torch 108 may be positioned within the periphery of the microwave energy source 104 and thus may extend, for example, through a hole, recess, cavity, etc. of the microwave energy source 104. In the illustrated embodiment, the plasma torch 108 extends through at least one of the resonant cavities 132 along a torch axis 142 from the torch inlet 138 to the torch outlet 140. The torch axis 142 may be parallel or substantially parallel to the cathode axis 118. The plasma torch 108 is thus structured to define or establish at least one gas flow path running through its interior (and through the corresponding resonant cavity 132) from the torch inlet 138 on the first side 126 to the torch outlet 140 on the second side 128. In the illustrated embodiment, the plasma torch 108 includes a tube enclosing an interior through which gas may flow, or two or more concentric tubes that are coaxial with the torch axis 142. In some embodiments, the outer diameter of the tube (or outermost tube) may be on the order of centimeters, but more generally no specific limitation is placed on the size of the tube. The plasma torch 108 may be composed of fused quartz or other suitable material having microwave transparency, a high melting point, and a low coefficient of thermal expansion. In other embodiments, the plasma torch 108 may include a plurality of tubes (or a plurality of sets of concentric tubes) extending through respective resonant cavities 132, thereby establishing multiple gas flow paths through the plasma source 100 along multiple torch axes.

In practice, the cathode 112 and interaction space 122 should be enclosed in an evacuated space (i.e., a vacuum chamber). Hence, in some embodiments it may be practical to enclose the entire microwave energy source 104 in an evacuated space. The plasma torch 108 is mounted in the resonant cavity 132 in a manner that fluidly isolates the torch interior from the vacuum environment.

It will be understood that the broad aspects of the present disclosure do not limit the microwave energy source 104 to having a magnetron or magnetron-like structure. More generally, the microwave energy source 104 may have any configuration that enables the plasma torch 108 to pass through a resonant space and plasma to be directly coupled to the as-generated microwave energy. For example, in some embodiments the microwave energy source 104 may not have a coaxial, symmetrical structure.

In some embodiments, the axis of symmetry of the anode 114 may be offset from the cathode axis 118. For some embodiments, such a configuration may compensate for the asymmetry presented by the plasma torch 108. In other embodiments, such compensation is not needed.

The microwave energy source 104 further includes a magnet, which may be a permanent magnet. The magnet may include one or more magnet components 406 and 410 (FIG. 4), which may be arranged to provide a desired orientation of the static magnetic field relative to the rest of the plasma source 100. In some embodiments, the magnet components 406 and 410 are positioned such that the strongest static magnetic field lines are parallel with the cathode axis 118 and thus also with the axes of the resonant cavities 132. The static magnetic field in this case orthogonally crosses the electric field generated by the microwave energy source 104. Additionally, with the plasma torch 108 oriented as described above and illustrated in FIGS. 1A and 1B, the oscillatory magnetic field generated during operation may also be aligned with the torch axis 142. This configuration is useful for producing a plasma plume that is cylindrical (or substantially cylindrical) and symmetric (or substantially symmetric) about the torch axis 142. Further, the parameters of the magnetic and electric field may be set such that the cross-section of the plasma plume has a desired shape, such as circular or elliptical with a desired eccentricity. Still further, the cross-section of the plasma plume may be "hollow" along the torch axis 142. The hollow region or core may be characterized as having a low density of plasma species and a low temperature (i.e, a "cold" region). The hollow region is useful, as an example, for introducing sample analytes or process reactants into the plasma. Generally, introducing sample analytes or process reactants directly into the denser, hotter region of the plasma may be more difficult to do and/or the desired interaction between the plasma and analytes or reactants may be less effective. Hollow plasma plumes are described and illustrated in U.S. Pat. No. 7,030,979, the content of which is incorporated herein by reference.

Figure 2A:
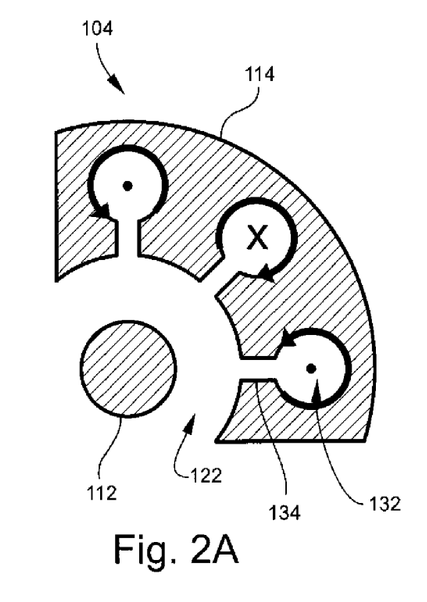
FIGS. 2A and 2B are plan views of a portion of a microwave energy source, illustrating oscillations at alternate phases of the cycle.
Figure 2B:
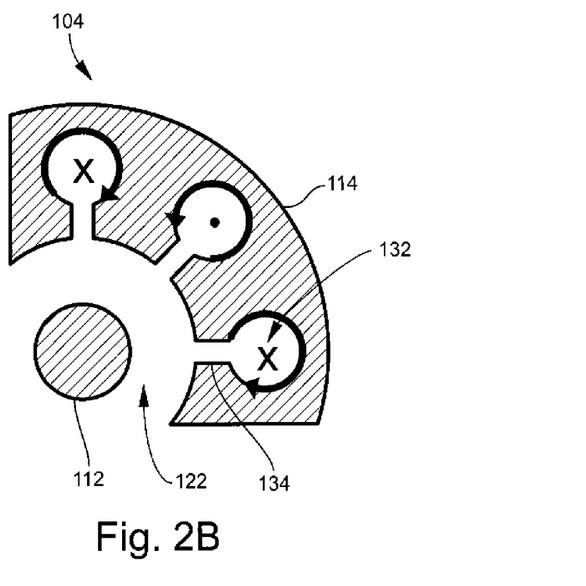

In operation, the microwave energy source 104 is immersed in the magnetic field provided by the magnet components 406 and 410. A continuous or pulsed direct current (DC) voltage is applied between the cathode 112 and anode 114 to generate an electric field that is radially oriented relative to the cathode axis 118. In some embodiments, another DC voltage or an alternating current (AC) voltage may be applied to the cathode 112 (or to a filament) to heat the cathode 112 or filament. The heat is sufficient to cause thermionic emission of electrons from the cathode 112. Alternatively, indirect heating may be utilized as appreciated by persons skilled in the art. Alternatively a separate electron source such as, for example, a field emitter may be utilized. The paths of the resulting emitted electrons are bent by the force of the magnetic field, causing the electrons to spiral outward, and resulting in a rotating space-charge "wheel" in the interaction space 122. Additional electrons may be liberated by secondary emission resulting from electrons returning to and bombarding the cathode 112. The "spokes" of the space-charge wheel sweep past the openings 134 to the resonant cavities 132 and induce oscillatory microwave-frequency fields therein. FIGS. 2A and 2B are plan views of a portion of the microwave energy source 104, illustrating the resulting oscillations at alternate phases of the cycle. The alternating current (AC current, which is microwave-range current in the present example) that develops is indicated by curved arrows, and the directions of the alternating/oscillating magnetic field are indicated by Xs (directed into the drawing sheet) and dots (directed out of the drawing sheet). The interaction between the electrons and the RF fields produces microwave emission. The sizes of the resonant cavities 132 determine the resonant frequency and thus the frequency of the emitted microwaves. In some embodiments, the microwave power output may be on the order of watts to kilowatts.

Figure 3A:
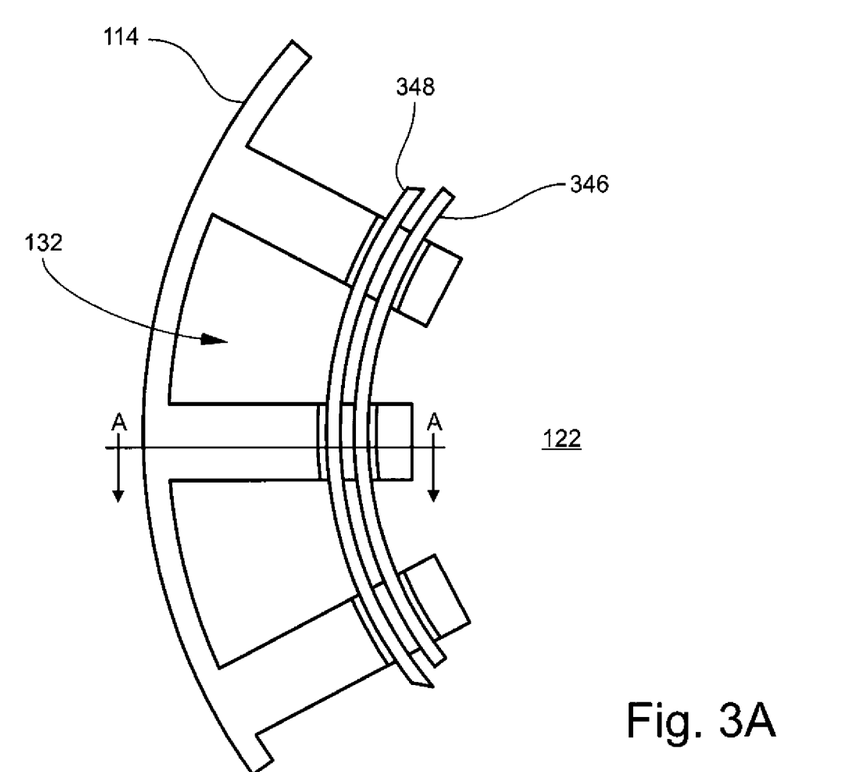
FIG. 3A is a plan view of a portion of an anode with strapped segments.
Figure 3B:
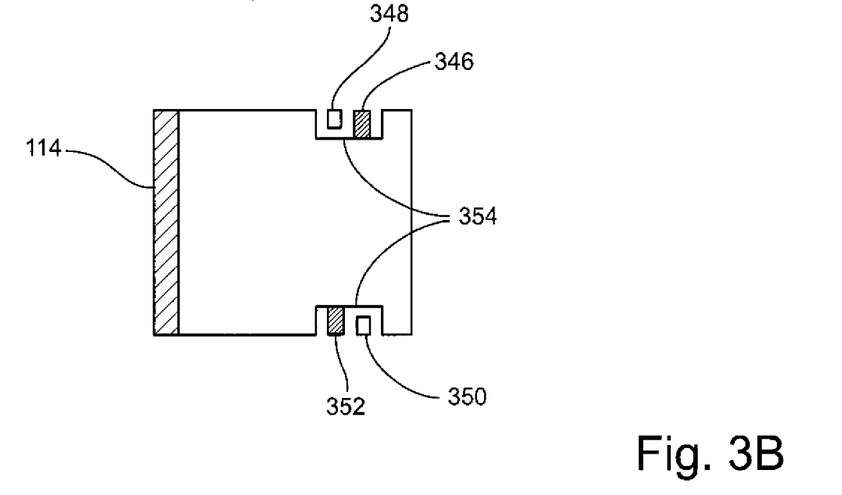
FIG. 3B is a cross-sectional view taken along line A-A of FIG. 3A.

Note that FIGS. 2A and 2B illustrate the pi-mode (or π mode) of oscillation, in which each resonant cavity 132 oscillates 180 degrees (π) out of phase with each adjacent resonant cavity 132. In the present embodiment the pi-mode may be implemented by adding a strapping structure (not shown) that electrically interconnects alternating anode segments (i.e., every other anode segment as one moves around the cathode axis 118). FIGS. 3A and 3B illustrate one non-limiting example of a strapping structure. Specifically, FIG. 3A is a plan view of a portion of the anode 114 and FIG. 3B is a cross-sectional view taken along line A-A of FIG. 3A. In this example, the strapping structure is a double-ring strapping that includes a pair of rings (straps) 346 and 348 on the first side and another pair of rings 350 and 352 on the second side. In each pair, one of the rings has a larger diameter than the other ring, and all rings 346-352 are coaxial with the cathode axis 118. The ring diameters may be sized such that the rings 346-352 cross the openings 134 between the interaction space 122 and the resonant cavities 132. The rings 346-352 may be positioned relative to the anode 114 such that each ring 346-352 alternately bypasses or is connected to successive anode segments, which may be facilitated by forming recesses 354 in the anode segments. For many magnetron-type structures, the pi-mode is considered optimal for assuring that energy is transferred to the oscillating fields with the highest efficiency, thus maximizing the microwave power generated. However, in other embodiments the microwave energy source 104 may operate at different modes, as appreciated by persons skilled in the art. Resonant modes and strapping strategies are further discussed in G. Hok, "The Microwave Magnetron," Advances in Electronics, Vol. II, edited by L. Marton, New York, Academic Press, 1950, p. 219-249, the content of which is incorporated herein by reference.

In a conventional use of a microwave energy source, the microwave power is extracted by tapping the AC current shown in FIGS. 2A and 2B. Conventional tapping may be accomplished by direct conductive coupling or by using an inductive pickup loop. In the latter case, the pickup loop is inserted in one of the resonant cavities. The oscillating magnetic field in the volume of the resonant cavity 132 (associated with the oscillating current around the inner wall of the resonant cavity 132) induces an AC current in the pickup loop, thereby transferring energy from the magnetron EM field mode to a load electrically connected to the pickup loop. By comparison, in embodiments disclosed herein the microwave power is tapped directly from magnetron EM field mode by the plasma (which has conductive and inductive properties) generated in the plasma torch 108. In this way, energy is coupled into the plasma directly, rather than indirectly by way of intermediate transfer elements. That is, the plasma itself is utilized as the power coupling means instead of a wire loop or other type of transfer element or waveguide. In some embodiments, the amount of microwave energy able to be extracted by the plasma may be greater than 70%, greater than 80%, or greater than 90%.

Referring back to FIGS. 1A and 1B, it is evident that any media flowing through the plasma torch 108 will be irradiated by the microwave energy emitted by the microwave energy source 104. In the present embodiment, a suitable plasma-forming gas is conducted into the plasma torch 108. Irradiation of the plasma-forming gas by the microwave energy generates and sustains a stable plasma plume. In some embodiments, an additional energy input may be utilized to ignite or strike the plasma, such as an arc/spark, a flame, another plasma discharge, or a light or laser beam. Examples of plasma-forming gases that may be utilized include, but are not limited to, nitrogen, other non-noble gases, argon, and other noble gases. Microwave generation and gas flow through the plasma torch 108 may continue for any desired duration of time to continually generate plasma. The as-generated plasma plume is discharged from the torch outlet 140 by the gas flow.

In some embodiments, one or more properties (amplitude, frequency, and/or phase) of the microwaves generated by the microwave energy source 104 may be measured while the plasma is being generated. Such microwave properties may be considered as containing complementary ("orthogonal") information about the impedance of the plasma. Thus, measuring microwave properties may be useful for measuring plasma properties such as electron density. Measuring microwave properties may also be useful for inferring information about the flow of material through the plasma, such as the arrival time of sample material into the plasma torch 108, the degree of ionization of the analytes, etc. A similar measurement might also provide information about the contents of the plasma torch 108 (specifically, the impedance of the contents of the resonant chamber occupied by the plasma torch 108) even in the absence of plasma but while the microwave energy source 104 is actively generating microwaves. Such a measurement may be useful as a non-destructive means for monitoring fluid flow or composition through the plasma torch 108. Generally, the microwaves generated by the microwave energy source 104 may be sampled and measured by any known device or means suitable for use with the microwave energy source 104. As one non-limiting example a pickup loop may be inserted in one of the resonant cavities 132, or other energy coupling device utilized, to sample the microwaves and the extracted signal may be transmitted to a waveform analyzer.

The interior of the plasma torch 108 may be at atmospheric, sub-atmospheric, or super-atmospheric pressure. The plasma may be discharged from the plasma torch 108 into an open, ambient environment or into a chamber. In the latter case, the chamber may be at atmospheric, sub-atmospheric, or super-atmospheric pressure. The chamber pressure may be the same as or different from the pressure in the plasma torch 108, and may be the same as or different from the very low pressure or vacuum in the housing that encloses the microwave energy source 104. The chamber may be isolated from the evacuated space of the microwave energy source 104 by a suitable boundary such as a fluid-tight wall. The plasma torch 108 may pass through such a boundary using a suitable fluid-sealed interface such as a feed-through structure.

The plasma may be utilized in a wide variety of plasma-based processes, including techniques for analyzing samples. Potential applications generally depend on the type of plasma-forming gas utilized and thus the active plasma species generated. As examples, the plasma source 100 may be utilized as an atomization and/or ionization source for optical emission spectrometry (OES) (or atomic emission spectrometry, AES) or mass spectrometry (MS). A flow of fluid containing analytes may be introduced into the flow of plasma-forming gas. While the mixture of gases and analytes flow through the plasma torch 108, the plasma is generated and atomizes and/or ionizes the analytes. The torch outlet 140 may discharge the plasma, gases and analyte material into the interior of the spectrometer for further processing. Depending on the type of analysis being done, the spectrometer may include a photodetector for measuring optical emissions of the atomized or ionized analytes, or an ion detector measuring the abundance of mass-to-charge ratios of the ionized analytes.

As further examples of plasma processes, the plasma may be utilized to remove coatings or layers from an underlying substrate, or for functionalizing the surface of a layer or substrate (e.g., promoting hydrophobicity or hydrophilicity), or for denaturing (bio)polymers. In applications related to microfabrication of MEMS (micro-electro-mechanical systems) devices or semiconductor devices, the plasma may be utilized as a dry etchant to remove layers, form vias for electrical interconnects, etc. In addition to material removal processes, the plasma may be utilized for additive processes in microfabrication applications, such as plasma enhanced (PE) vacuum deposition (e.g., PE physical vapor deposition, magnetron sputtering, and PE chemical vapor deposition). In such processes, the plasma may serve solely as an energetic medium or also as a reactive medium. In such processes, a reagent may be added to the plasma by merging a stream of precursor material into the plasma-forming gas stream prior to generation of the plasma, for purposes such as synthesis of nitrides, oxides, carbides, sulfides or other compounds. Also in microfabrication applications, the plasma may be utilized to facilitate an ion implantation or doping process. In another example, particles/powders or dissolved precursor materials may be entrained in a carrier gas that is merged with the plasma-forming gas stream in the course of a process for fabricating nanoparticles such as quantum dots. The plasma may also be generated as part of a gasification process utilized, for example, for waste processing, treatment, disposal, or for gasification of solid/liquid hydrocarbons as is done in the petrochemical industry. The plasma may also find use in sterilization processes, such as for destroying or detoxifying microbes, fungi and/or viruses.

Figure 4:
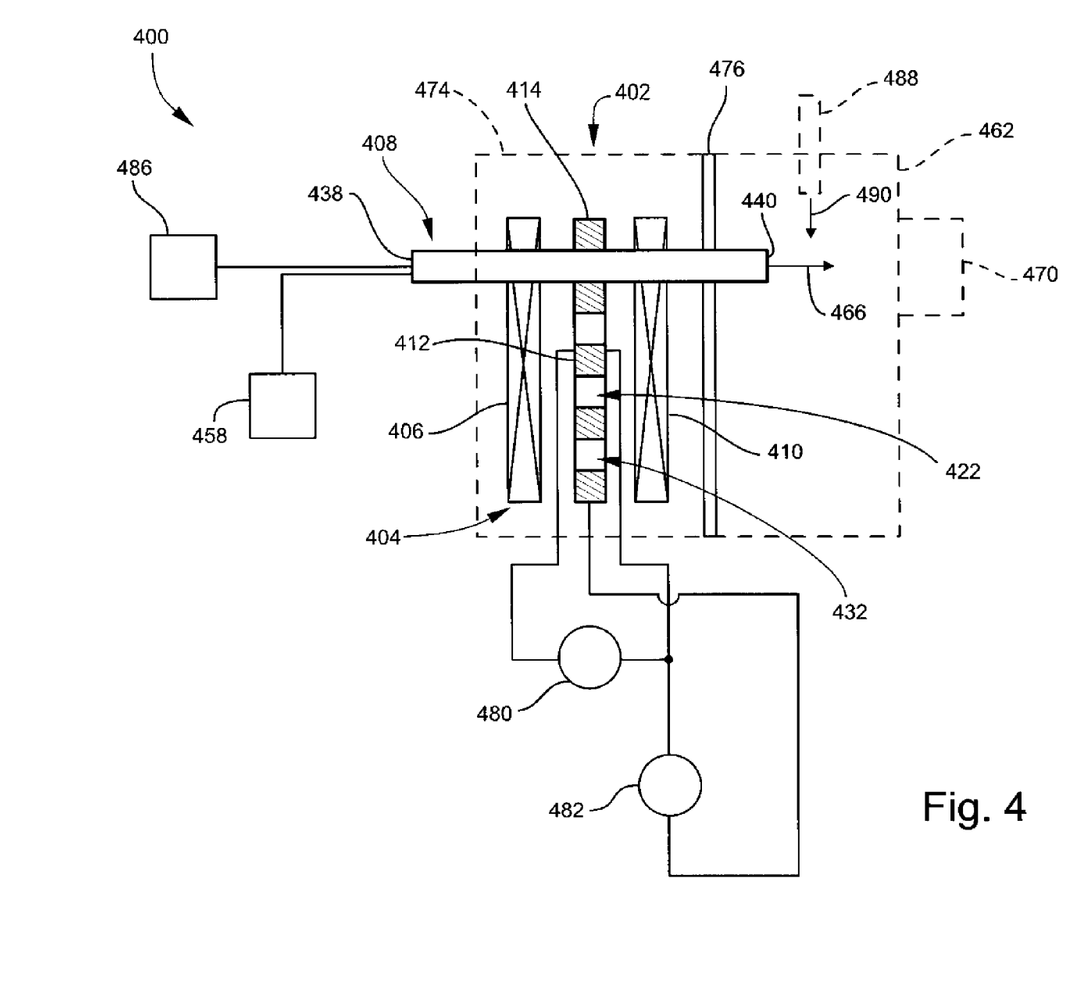
FIG. 4 is a schematic view of an example of a plasma processing system according to some embodiments.

FIG. 4 is a schematic view of an example of a plasma processing system 400 according to some embodiments. The plasma processing system 400 generally includes a plasma source 402 and a plasma-forming gas source 458. The plasma source 402 includes a microwave energy source 404, a plasma torch 408, and magnet components 406 and 410. The plasma-forming gas source 458 communicates with an inlet 438 of the plasma torch 408. The plasma processing system 400 may also include a chamber 462 communicating with an outlet 440 of the plasma torch 408, and which is external to the microwave energy source 404. The chamber 462 may represent or be part of any apparatus configured for utilizing plasma 466 supplied by the plasma source 402. The chamber 462 may represent, for example, an analytical instrument such as a spectrometer (e.g., an OES, MS, etc.). The analytical instrument may include an appropriate detector 470 such as noted above by example. The chamber 462 may also represent a reaction chamber or plasma treatment chamber for purposes such as noted above. Alternatively, the chamber 462 may represent an ambient environment outside of the plasma source.

The microwave energy source 404 may include a cathode 412, an anode 414 with resonant cavities 432, and an interaction space 422 between the cathode 412 and anode 414 as described above. The microwave energy source 404 (or at least its cathode 412 and interaction space 422) is enclosed in a vacuum housing 474. The vacuum housing 474 may be isolated from the chamber 462 by a suitable boundary 476 through which the plasma torch passes in a sealed manner. Also schematically shown are voltage sources 480 and 482 for respectively heating the cathode 412 and applying a DC potential between the cathode 412 and anode 414.

The plasma processing system 400 may further include one or more additional fluid sources 486 communicating with the torch inlet 438. The fluid source(s) 486 may supply one or more gases, or liquids to be vaporized or nebulized. The types of fluids supplied will depend on how the plasma processing system 400 is being implemented. A fluid may, for example, be an analyte compound or a matrix of an analyte entrained in a carrier gas, possibly with other components such as solvents. The fluid may be a carrier gas with liquid droplets entrained therein, or an aerosol. The fluid may be or include an additive to the plasma-forming gas and serves a role as an active species of the subsequently formed plasma 466, such as an ion or an electronically excited molecule. The fluid may be or include a reagent that is utilized in the chamber 462, or a chemical precursor compound that is dissociated by the plasma 466 in preparation for a synthesizing process or film growth in the chamber 462.

Generally, an additional fluid may be introduced into the plasma processing system 400 at a point upstream of the plasma torch 408, at a point inside the plasma torch 408, or at a point downstream of the plasma torch 408. The additional fluid may be mixed with the plasma-forming gas upstream of the plasma torch 408 or inside the plasma torch 408. FIG. 4 schematically illustrates the additional fluid and the plasma-forming gas being supplied to the torch inlet 438 in parallel. For example, the additional fluid may enter a central tube of the plasma torch 408 while the plasma-forming gas enters an annular space between the central tube and an outer tube that coaxially surrounds the central tube. In this case, the outlet of the central tube may end at a point before the plasma-forming gas is energized into plasma. It will be understood, however, that the additional fluid may be mixed or merged with the plasma-forming gas upstream such that a single mixed flow is supplied to the torch inlet 438. Alternatively, the additional fluid may be mixed with the plasma, which may occur inside the plasma torch 408 or downstream of the plasma torch 408. For example, as just noted the plasma torch 408 may include coaxial tubes and the outlet of the central tube may end at a point where a stable plasma plume has formed. As another example, the plasma processing system 400 may include a conduit 488 leading into the chamber 462 and positioned to direct a flow 490 of analytes or other flowable material toward the plasma 466 emitting from the torch outlet 440.

Figure 5:
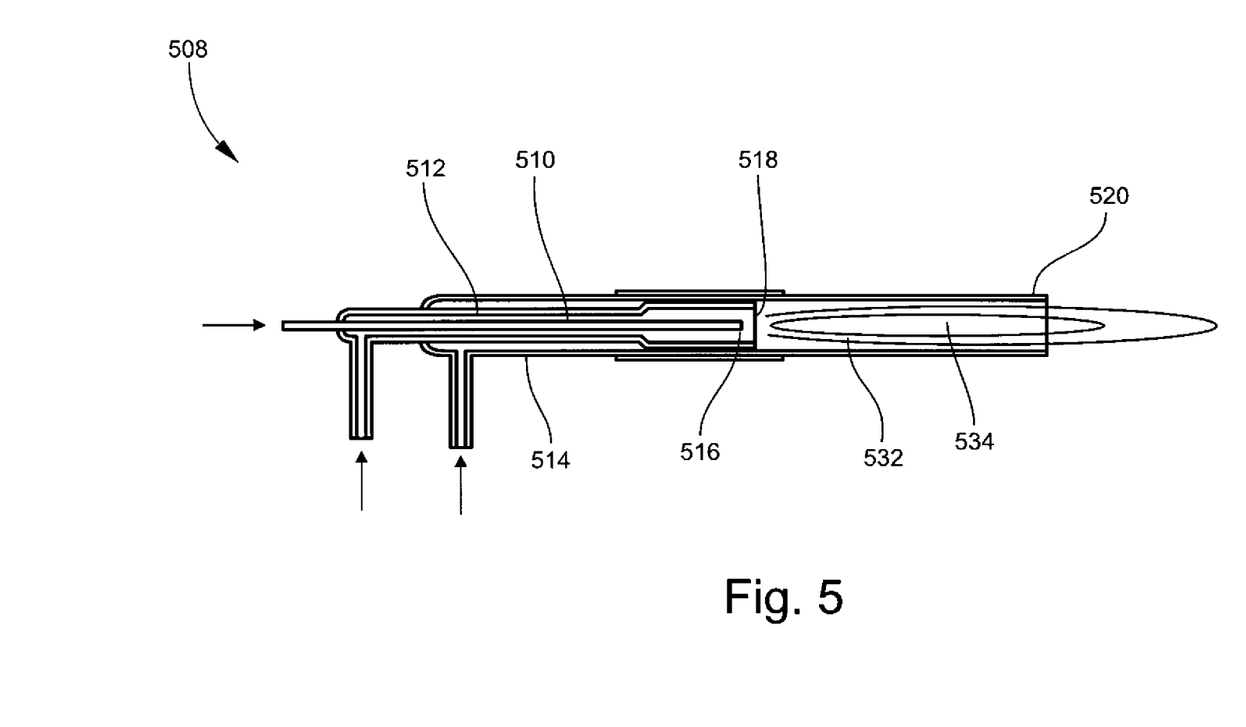
FIG. 5 is a cross-sectional view of an example of a plasma torch according to some embodiments.

FIG. 5 is a cross-sectional view of an example of a plasma torch 508 according to some embodiments. The plasma torch 508 includes a plurality of coaxial tubes that define a plurality of flow paths along the torch axis. In the illustrated embodiment, a first tube 510 is positioned on the torch axis, a second tube 512 surrounds the first tube 510, and a third tube 514 surrounds the second tube 512. The axial positions of respective outlets 516, 518 and 520 of the tubes 510, 512 and 514 may be the same or different. A plasma plume 532 is shown as being discharged from the plasma torch 508. In the illustrated embodiment, the second tube outlet 518 is inside the third tube 514, i.e., the second tube outlet 518 is axially upstream of the third tube outlet 520. The first tube outlet 516 may be located inside the second tube 512 for a purpose such as avoid contact with the hot plasma. Generally, the plasma forming gas, a fluid to be mixed or interacted with the plasma forming gas or with the plasma generated in the plasma torch 508 (such as, for example, a sample-containing carrier gas), and optionally an additional fluid, may be fed to any of the tubes 510, 512 and 514. In some embodiments, the fluid to be mixed or interacted with the plasma plume 532 is supplied to the first tube 510 such that the fluid is discharged into a central region 534 of the plasma plume 532, which may be a cold or hollow region as described above. In some embodiments, the optional additional fluid may be supplied to the plasma torch 508 for a purpose such as maintaining a desired flow rate from the torch outlet, radially confining or controlling the shape of the plasma plume 532, and/or keeping the hot plasma away from surfaces of the plasma torch 508.

In other embodiments, the plasma gas(es) may be held stationary in one or more of the resonant cavities, by having zero flow rate in the plasma torch 508 or by containment in a closed or closable chamber positioned in the resonant cavity. A plasma process may thus be carried out in the zero flow-rate plasma torch 508 or other type of chamber.

As evident from the foregoing description, certain embodiments disclosed herein enable the direct coupling of microwave radiation, such as magnetron-generated microwave radiation, to process gases to create, sustain or otherwise excite a plasma discharge. This may be accomplished within a small footprint, and with few or no moving parts, and in such a way as to minimize or eliminate the need for microwave hardware external to the magnetron or other microwave energy source. Generally, the size scale of resonant microwave components is set by the wavelength of the microwave radiation, which is set by the plasma requirements. This leads to fundamental minimum limits for the size of resonant structures and coupling elements. By eliminating the need for such components, embodiments disclosed herein may largely remove such constraints. The smaller size and shorter parts list may also translate into reductions in cost and complexity, which may for example facilitate the development of economical and portable spectrometry/spectroscopy instruments.

Moreover, certain embodiments disclosed herein take advantage of inherent rotational symmetries present in magnetron EM field patterns. This may eliminate the need for intermediate components (e.g., resonant irises, high-dielectric interfaces) between the microwave generator and the plasma, and thus may address the traditional problem of mismatch in symmetry as between the EM field distributions and the plasma. Additionally, certain embodiments disclosed herein are well suited for analytical and plasma processing applications, as well as other applications that could benefit from a compact, rugged and stable plasma source. The plasma source may exhibit auto-stabilization and auto-impedance matching to a degree that may partially or completely compensate for perturbations associated with the presence of changing plasma conditions in the plasma torch, such as may occur during changes in the composition or quantity of analytes introduced to the plasma torch.

EXEMPLARY EMBODIMENTS

Exemplary embodiments provided in accordance with the presently disclosed subject matter include, but are not limited to, the following:

1. A plasma source for generating microwave-induced plasma, comprising: a microwave energy source comprising a cathode on a cathode axis, and an anode coaxially surrounding the cathode and spaced from the cathode by an interaction space, the anode comprising a plurality of resonant cavities positioned at one or more radial distances from the cathode axis, wherein the microwave energy source comprises a first side, a second side, and a thickness from the first side to the second side along the cathode axis; and a plasma torch extending through at least one of the resonant cavities and comprising a torch outlet on the second side, wherein the plasma torch establishes a gas flow path from the first side to the second side 2. The plasma source of embodiment 1, wherein the plasma torch extends along a torch axis parallel with the cathode axis.

3. The plasma source of embodiment 1 or 2, wherein the cathode and the interaction space are disposed in an evacuated chamber, and the plasma torch is fluidly isolated from the evacuated chamber 4. The plasma source of any of embodiments 1-3, wherein the plurality of resonant cavities partitions the anode into a plurality of anode segments, and further comprising a strapping structure electrically interconnecting alternate anode segments.

5. The plasma source of any of embodiments 1-4, wherein the microwave energy source has a magnetron geometry.

6. The plasma source of any of embodiments 1-5, wherein the microwave energy source has a geometry selected from the group consisting of a hole-and-slot magnetron, a vane magnetron, a slot magnetron, and a rising-sun magnetron.

7. The plasma source of any of embodiments 1-6, wherein the plasma torch comprises a plurality of tubes extending through a plurality of respective resonant cavities, each tube establishing a gas flow path from the first side to the second side.

8. The plasma source of any of embodiments 1-7, comprising a plasma-forming gas source communicating with the plasma torch on the first side.

9. The plasma source of embodiment 8, comprising an additional gas source communicating with the plasma torch on the first side.

10. The plasma source of any of embodiments 1-9, wherein the plasma torch comprises a torch inlet on the first side and an upstream mixer communicating with the torch inlet, and further comprising a first gas conduit and a second gas conduit respectively communicating with the mixer.

11. The plasma source of any of embodiments 1-10, wherein the plasma torch comprises a first tube and a second tube coaxially surrounding the first tube about the torch axis.

12. A plasma processing system, comprising: the plasma source of claim 1, wherein the plasma torch comprises a torch inlet on the first side; a plasma-forming gas source communicating with the torch inlet; and an apparatus comprising a chamber communicating with the torch outlet.

13. The plasma processing system of embodiment 12, comprising a conduit configured for conducting an additional gas to the plasma torch or to the chamber.

14. The plasma processing system of embodiment 12 or 13, wherein the chamber is selected from the group consisting of a chamber of an optical emission spectrometer, a chamber of a mass spectrometer, a chamber configured for physical or chemical vapor deposition, a chamber configured for compound synthesis, and a chamber configured for dry etching.

15. A method for supplying plasma, the method comprising: generating microwave energy by operating a microwave energy source that comprises a resonant cavity through which a plasma torch extends; generating plasma by flowing a plasma-forming gas through the plasma torch, wherein the plasma-forming gas is irradiated by the microwave energy; and flowing the plasma from an outlet of the plasma torch.

16. The method of embodiment 15, comprising operating the microwave energy source in the pi-mode of oscillation.

17. The method of embodiment 15 or 16, wherein the microwave energy source comprises a cathode and an anode immersed in a magnetic field, the anode coaxially surrounds a cathode and is spaced from the cathode by an interaction space, and the resonant cavity is formed through the anode, and wherein generating microwave energy comprises applying a DC voltage between the cathode and the anode and thermionically emitting electrons from the cathode.

18. The method of any of embodiments 15-17, wherein generating plasma comprises generating a cylindrical plasma plume that is generally symmetrical about an axis of the plasma torch, while the plasma torch is immersed in a magnetic field aligned with the axis.

19. The method of embodiment 18, wherein the plasma plume is hollow along the axis of the plasma torch and has a circular or elliptical cross-section.

20. The method of any of embodiments 15-19, wherein the plasma-forming gas is selected from the group consisting of nitrogen, other non-noble gases, argon, other noble gases, and a combination of two or more of the foregoing.

21. The method of any of embodiments 15-20, comprising mixing the plasma-forming gas with a fluid at a point upstream of the plasma torch, in the plasma torch, or downstream of the outlet.

22. The method of embodiment 21, comprising flowing the fluid through a central tube of the plasma torch and flowing the plasma-forming gas through an annular space between the central tube and an outer tube of the plasma torch.

23. The method of embodiment 21 or 22, wherein the fluid is selected from the group consisting of a carrier gas, an analyte vapor or gas energizable by the plasma, a carrier gas with analytes entrained therein, a carrier gas with particles entrained therein, and a gas-phase compound that is precursor for chemical synthesis or film deposition.

24. The method of any of embodiments 21-23, wherein mixing forms a mixture of the plasma-forming gas and a carrier gas in which analytes are entrained, and flowing the plasma comprises flowing the plasma with the mixture such that the plasma interacts with the analytes.

25. The method of embodiment 24, wherein the plasma atomizes or ionizes the analytes while the plasma and the mixture flow through the plasma torch, and further comprising measuring optical emissions of the atomized or ionized analytes or measuring mass-to-charge ratios of the ionized analytes.

It will be understood that terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A plasma source for generating microwave-induced plasma, comprising:
    a microwave energy source comprising a main structure, the main structure comprising a cathode on a cathode axis, and an anode spaced from the cathode by an interaction space, wherein the main structure further comprises a first side, a second side, and a thickness from the first side to the second side along the cathode axis; and
    a plasma torch positioned at the microwave energy source and comprising a torch outlet on the second side, wherein the plasma torch establishes a gas flow path through the plasma torch from the first side to the second side, and the plasma torch is positioned such that a gas flowing along the gas flow path in the plasma torch is irradiated by microwave energy generated by the microwave energy source.

2. The plasma source of claim 1, wherein the anode comprises a plurality of resonant cavities positioned at one or more distances from the cathode axis, and the plasma torch extends through at least one of the resonant cavities.

3. The plasma source of claim 1, wherein the cathode and the interaction space are disposed in an evacuated chamber, and the plasma torch is fluidly isolated from the evacuated chamber.

4. The plasma source of claim 1, wherein the anode comprises a plurality of resonant cavities positioned at one or more distances from the cathode axis, and the anode coaxially surrounds the cathode and the resonant cavities are positioned at one or more radial distances from the cathode axis.

5. The plasma source of claim 1, comprising one or more additional plasma torches, each additional plasma torch establishing a gas flow path from the first side to the second side.

6. The plasma source of claim 1, comprising a plasma-forming gas source communicating with the plasma torch on the first side.

7. The plasma source of claim 1, wherein the plasma torch comprises a torch inlet on the first side and an upstream mixer communicating with the torch inlet, and further comprising a first conduit and a second conduit respectively communicating with the mixer.

8. The plasma source of claim 1, wherein the plasma torch comprises a first tube and a second tube coaxially surrounding the first tube.

9. A plasma processing system, comprising:
    the plasma source of claim 1, wherein the plasma torch comprises a torch inlet on the first side;
    a plasma-forming gas source communicating with the torch inlet; and
    a chamber communicating with the torch outlet.

10. The plasma processing system of claim 9, comprising a conduit configured for conducting an additional fluid to the plasma torch or to the chamber.

11. The plasma processing system of claim 9, wherein the chamber is part of an optical emission spectrometer or a mass spectrometer.

12. A method for supplying plasma, the method comprising:
    generating microwave energy by operating a microwave energy source that comprises a main structure, the main structure comprising a cathode on a cathode axis, and an anode spaced from the cathode by an interaction space, wherein the main structure further comprises a first side, a second side, and a thickness from the first side to the second side along the cathode axis;
    generating plasma by flowing a plasma-forming gas into a plasma torch from the first side, wherein the plasma-forming gas is irradiated by the microwave energy; and
    flowing the plasma from an outlet of the plasma torch on the second side.

13. The method of claim 12, wherein the anode coaxially surrounds the cathode and comprises a resonant cavity formed through the anode, and wherein generating microwave energy comprises applying a DC voltage between the cathode and the anode and providing electrons in the interaction space.

14. The method of claim 12, wherein generating plasma comprises generating a cylindrical plasma plume that is generally symmetrical about an axis of the plasma torch, while the plasma torch is immersed in a magnetic field aligned with the axis.

15. The method of claim 14, wherein the plasma plume comprises a low-density or low-temperature region along the axis of the plasma torch and has a circular or elliptical cross-section.

16. The method of claim 12, comprising mixing the plasma-forming gas with a fluid at a point upstream of the plasma torch, in the plasma torch, or downstream of the outlet.

17. The method of claim 16, comprising flowing the fluid through a central tube of the plasma torch and flowing the plasma-forming gas through an annular space between the central tube and an outer tube of the plasma torch.

18. The method of claim 16, wherein the fluid is selected from the group consisting of a carrier gas, an analyte vapor or gas energizable by the plasma, a carrier gas with analytes entrained therein, a carrier gas with particles entrained therein, a carrier gas with liquid droplets entrained therein, an aerosol, and a gas-phase compound that is a precursor for chemical synthesis or film deposition.

19. The method of claim 16, wherein mixing forms a mixture of the plasma-forming gas and a carrier gas in which analytes are entrained, and flowing the plasma comprises flowing the plasma with the mixture such that the plasma interacts with the analytes.

20. The method of claim 19, wherein the plasma atomizes or ionizes the analytes while the plasma and the mixture flow through the plasma torch, and further comprising measuring optical emissions of the atomized or ionized analytes or measuring mass-to-charge ratios of the ionized analytes.

* * * * *